Figure 1:
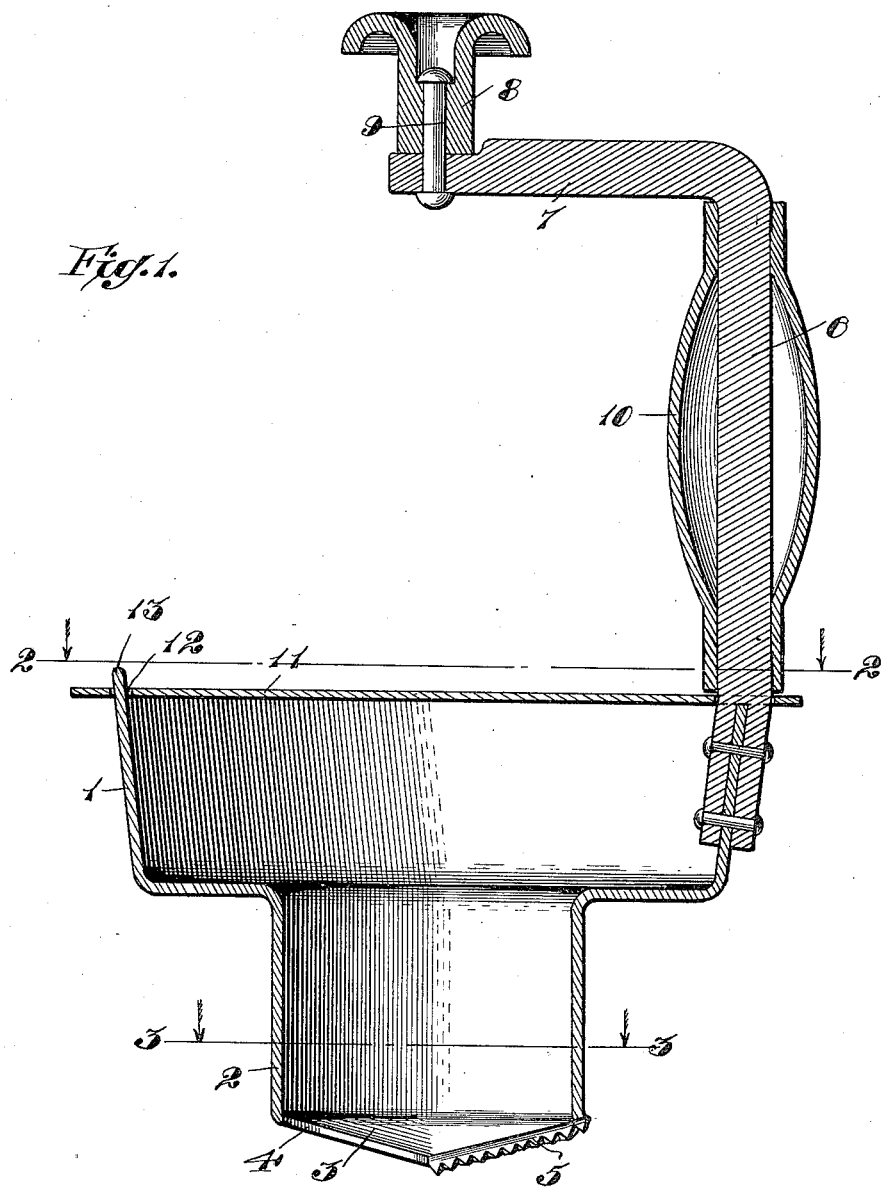

E. H. SHELDON.
ICE CUTTING OR SHAVING DEVICE.
APPLICATION FILED MAR. 24, 1904.

1,013,823.

Patented Jan. 2, 1912.

2 SHEETS—SHEET 1.

Witnesses:
G. V. Domarus
J. C. Lee

Inventor:
Edgar H. Sheldon
by A. Miller Belfield
Attorney.

E. H. SHELDON.
ICE CUTTING OR SHAVING DEVICE.
APPLICATION FILED MAR. 24, 1904.
1,013,823.
Patented Jan. 2, 1912.
2 SHEETS—SHEET 2.
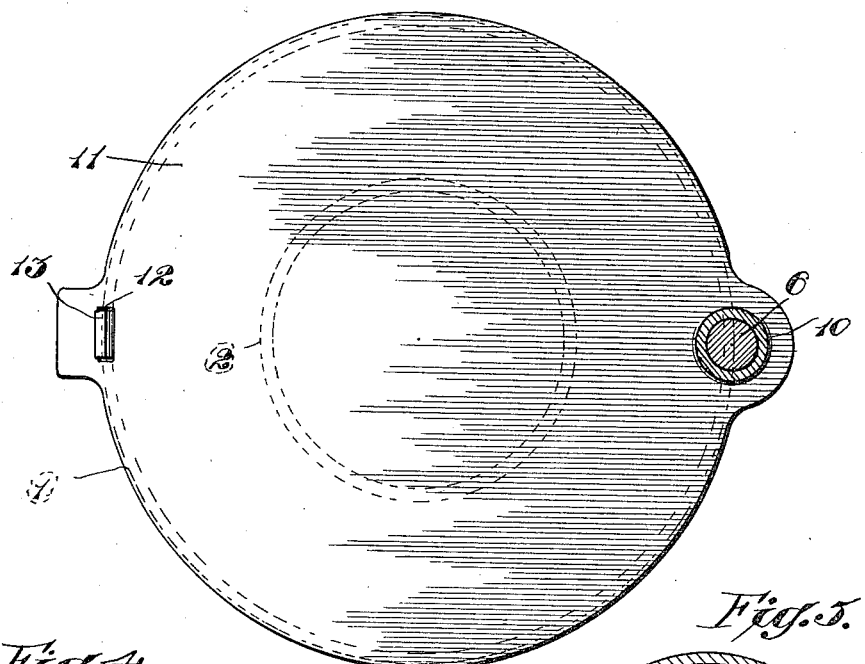
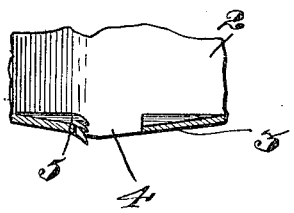
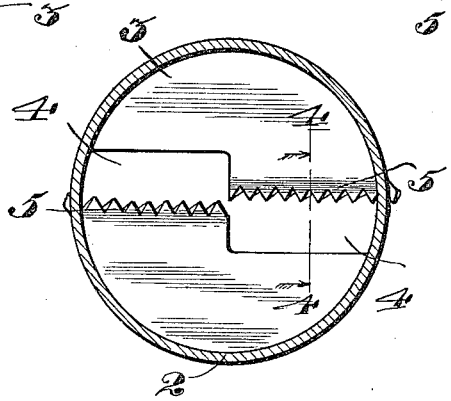
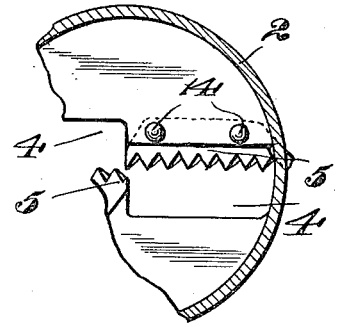
Witnesses:
G. V. Domarus
J. C. Lee
Inventor:
Edgar H. Sheldon
by A. Miller Refield
Attorney.

UNITED STATES PATENT OFFICE.

EDGAR H. SHELDON, OF CHICAGO, ILLINOIS.

ICE CUTTING OR SHAVING DEVICE.

1,013,823. Specification of Letters Patent. Patented Jan. 2, 1912.

Application filed March 24, 1904. Serial No. 199,710.

*To all whom it may concern:*

Be it known that I, EDGAR H. SHELDON, a citizen of the United States, residing at Chicago, in the county of Cook and State of Illinois, have invented a certain new and useful Improvement in Ice Cutting or Shaving Devices, of which the following is a full, clear, concise, and exact description, reference being had to the accompanying drawings, forming a part of this specification.

My invention relates to devices for cutting or shaving ice to prepare it for cooling purposes.

Prominent objects of the invention are, to provide a simple, practical and inexpensive device of this kind; to arrange for the ready and easy operation of the same to cut or shave the ice; to prevent the loss of the ice during the cutting or shaving operation; to arrange for the quick and easy removal of the same when desired; and to accomplish the above results in a simple, expeditious and easy manner.

In the accompanying drawings, Figure 1 is a vertical section of an ice cutting or shaving device embodying my present invention; Figs. 2 and 3 are sections taken on lines 2—2 and 3—3 respectively in Fig. 1; Fig. 4 is a section taken on line 4—4 in Fig. 3; and Fig. 5 is a partial section similar to Fig. 3 of a modified form of device.

The device shown in the drawings for carrying out my invention, comprises a bowl 1 conveniently made of annular form and constructed with a downward extension 2 of less diameter than the diameter of the bowl 1. The bottom 3 of the extension 2 is made with openings 4, 4 formed on opposite sides of said bottom, and the adjacent edges of these openings are provided with cutters 5, 5, shown with toothed edges. The bottom 3 is desirably made in the form of an inverted cone, as well shown in Fig. 1. A handle 6 is secured to the bowl 1 being conveniently riveted thereto and extended upwardly therefrom. This handle 6 is provided with a bent end 7 carrying a hand piece 8 loosely attached by means of a rivet 9. The handle 6 is desirably provided with a loose sheath 10. A top 11 for the bowl, is arranged to cover the same, being conveniently fastened loosely upon the handle 6 and provided with an aperture 12 capable of engaging a prong 13 extending up from the bowl.

In the arrangement shown in Fig. 3 the cutters 5, 5 are formed integral with the bottom 3, whereas in the arrangement shown in Fig. 5, these cutters are made separate from the bottom and attached thereto as by rivets 14, 14.

The operation of the device is as follows: The device is placed upon a cake or other piece of ice and the hand piece 8 grasped in one hand and the sheath 10 on the handle 6 in the other. The handle 6 is then revolved, thereby turning the bowl 1 also. This rotation of the bowl causes the cutters 5, 5, to cut the ice, the cuttings or shavings passing into the extension 2 of the bowl by way of the openings 4, 4. This rotation of the device, with its cutting action, is continued until the extension 2 and bowl are practically filled with cuttings or shavings. The device of course works its way down into the ice as this operation goes on. The shavings, as cut, occupy more space than the solid ice and so the bowl, including the enlargement 1, is filled by shavings in making a hole sufficient to accommodate the reduced bottom 2. When the bowl is filled, or when sufficient ice cuttings or shavings have been made, the cover 11 is released from the prong 13 and swung to one side so as to open the bowl, whereupon the shavings or cuttings are removed.

It will be seen that the device is simple and practical; that it will operate easily and quickly and with very little effort; and that it can be made and capable of great durability.

It will be understood that changes and modifications can be made in the device without departing from the spirit of my invention.

What I claim as my invention is:—

1. A device of the class specified, comprising a rotary bowl adapted to be placed upon the ice and rotated, and having its bottom provided with cutting devices adapted to cut the ice upon the rotation of the bowl, and a crank device attached to the bowl for rotating the same, said crank device having a handle substantially in alinement with the axis of rotation of said bowl.

2. A device of the class specified, comprising a bowl having its bottom provided with radially disposed cutting devices, and a crank device having a vertically disposed portion 6 secured to the rim of the bowl and extended upwardly therefrom, and a transverse portion 7 extending transversely to the portion 6 and provided with a hand piece 8 located substantially over the center of the bowl.

3. A device of the class specified, comprising a bowl consisting of a reduced bottom portion 2 and an enlarged upper portion 1, the bottom portion 2 having its bottom provided with radially disposed cutting devices, and a crank device for rotating the bowl, consisting of a bent member secured to the rim of the enlarged portion 1 of the bowl and having a vertically extending portion 6 and a transverse portion 7, and also having a hand piece 8 located substantially over the center of the bowl.

4. A device of the class specified, comprising a bowl having its bottom provided with a pair of diametrically arranged cutting devices 5, 5, facing in opposite directions, and also provided with apertures 4, 4 in advance of said cutting devices when the bowl is rotated, and a crank handle 6 having its lower end secured to one side of the bowl and being extended upwardly therefrom and having its upper end extended laterally over the bowl and provided with a handle 8 above the center of the bowl.

5. A device of the class specified, comprising a rotary bowl having a reduced lower portion and an enlarged upper portion, cutting devices in the bottom of the bowl adapted to cut upon the rotation of the bowl, and means for rotating the bowl, said means including a handle, etc.

6. A device of the class specified, comprising a rotary bowl having a pointed bottom provided with cutting devices, and a crank attached to the bowl for rotating the same, said crank device having a handle substantially in alinement with the axis of rotation of said bowl.

7. An ice shaver comprising a bowl having a transverse bottom provided with slots extending across its entire width, and with cutting edges for said slots, said edges facing in opposite directions, and means for rotating said bowl.

8. A shaving device of the class described, comprising a rotary bowl provided with cutting edges extending transversely across the entire face of said bowl, and a crank for operating said bowl, said crank device having a handle substantially in alinement with the axis of rotation of said bowl.

9. An ice shaving device, comprising a rotary bowl provided with cutting edges so arranged that said bowl upon proper actuation enters the aperture made by said cutting edges and receives the shaved material released by the action of said cutting edges, and a crank for operating said bowl, said crank device having a handle substantially in alinement with the axis of rotation of said bowl.

10. A device of the class specified, comprising a bowl or receptacle having its bottom provided with cutting devices facing in opposite directions on opposite sides of the center, an upper enlarged portion of the bowl and a crank attached to said enlarged portion.

11. An ice shaver comprising a bowl having a cylindrical portion, a transverse bottom for said cylindrical portion, said bottom being provided with slots extending across its entire width and with cutting edges for said slots, said edges facing in opposite directions, and means for rotating said bowl.

12. An ice shaver comprising a bowl having two portions of different diameter, the smaller portion being of cylindric shape and having a transverse bottom, said bottom being provided with slots extending across its entire width and with cutting edges for said slots, and means for rotating said bowl.

In witness whereof, I hereunto subscribe my name this 14th day of March A. D., 1904.

EDGAR H. SHELDON.

Witnesses:
A. MILLER BELFIELD,
I. C. LEE.